R. M. TEMPLE.
MIXER.
APPLICATION FILED FEB. 12, 1914.
1,120,563.
Patented Dec. 8, 1914.
2 SHEETS—SHEET 2.
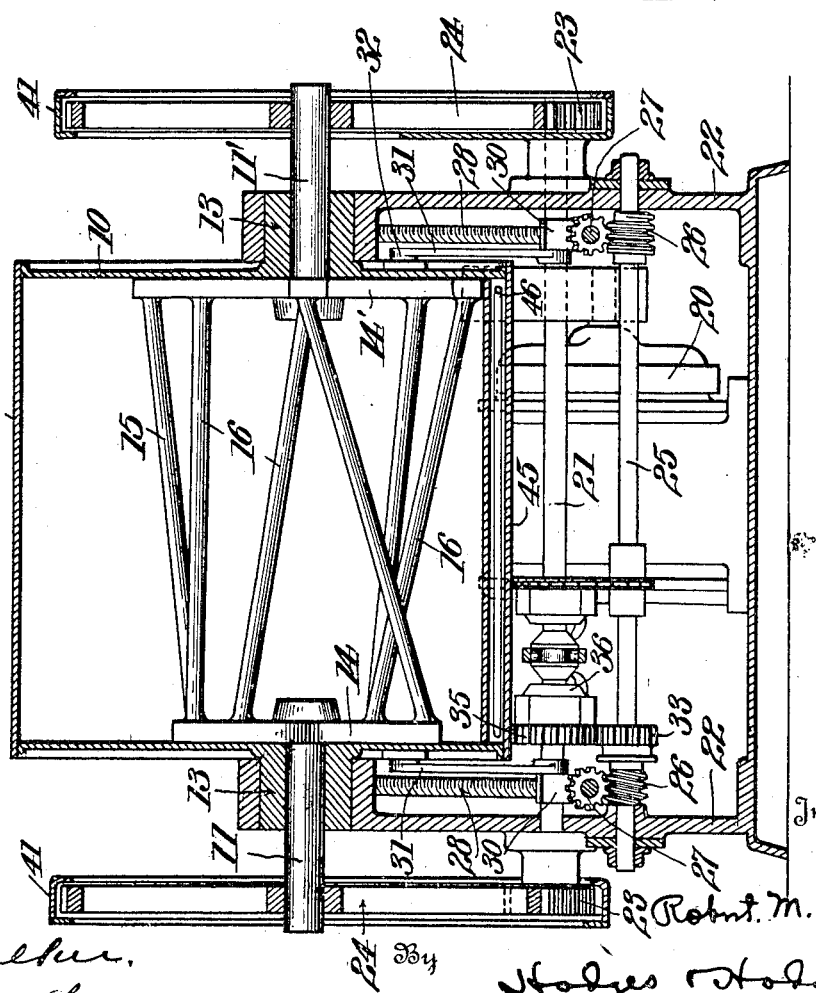
Witnesses
Inventor
Robt. M. Temple
By Hodges & Hodges
Attorneys

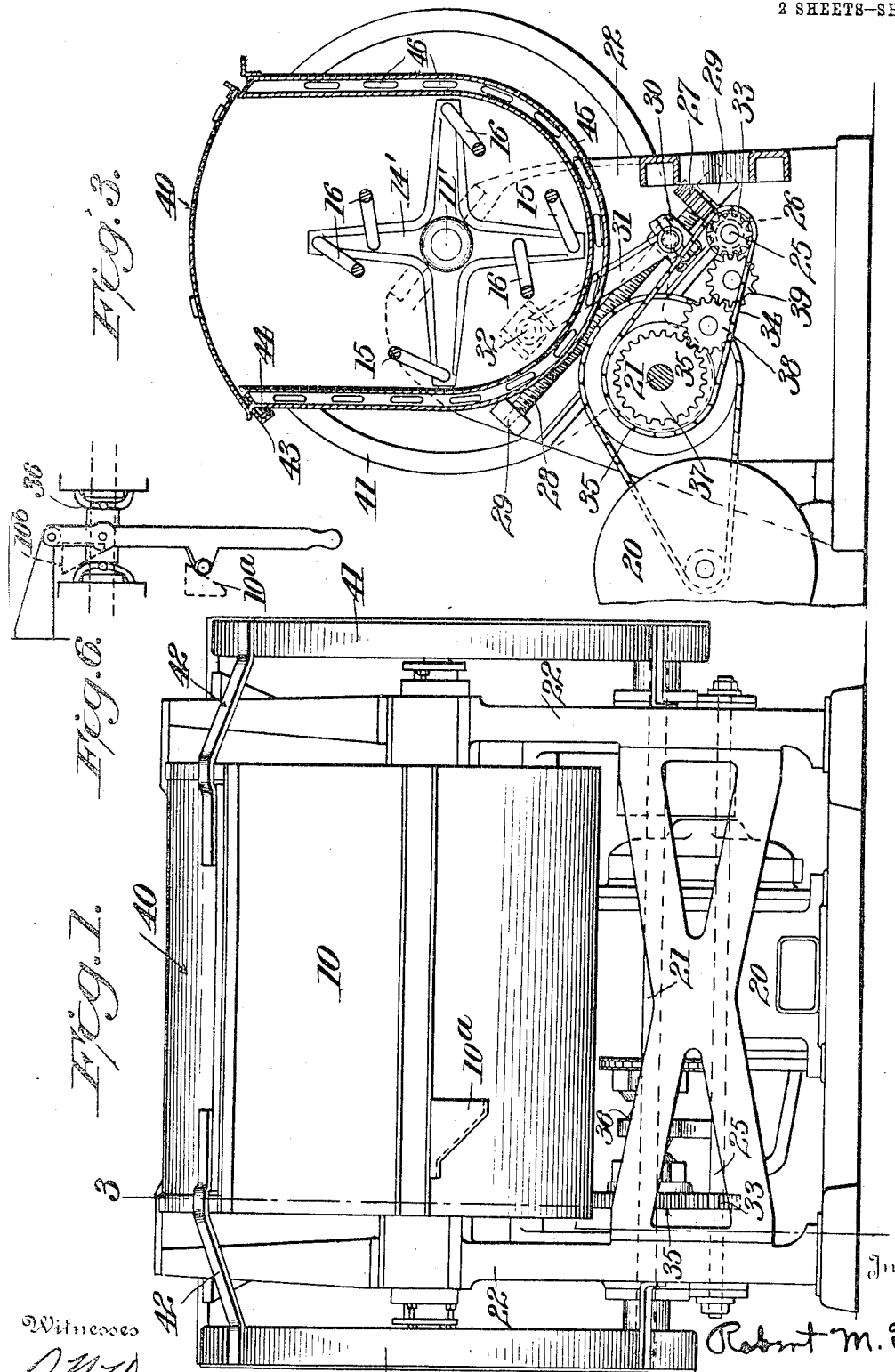

UNITED STATES PATENT OFFICE.

ROBERT M. TEMPLE, OF PHILADELPHIA, PENNSYLVANIA.

MIXER.

1,120,563.  Specification of Letters Patent.  Patented Dec. 8, 1914.

Application filed February 12, 1914. Serial No. 818,231.

*To all whom it may concern:*

Be it known that I, ROBERT M. TEMPLE, a citizen of the United States, residing at Philadelphia, in the county of Philadelphia and State of Pennsylvania, have invented new and useful Improvements in Mixers, of which the following is a specification.

This invention relates to mixers of that class employed in mixing bread, cake and similar doughs, icings, chocolate, printing ink, paints, and similar masses of a doughy or pasty nature.

One of the objects of the invention is to produce an improved apparatus by means of which the contents of the mixer are subjected to a uniform, though violent agitation, by means of which the dry and liquid materials are first shaken into granular form and subsequently to a smooth and elastic consistency, after which the continued operation of the apparatus will so completely mix the ingredients within the mixer as to produce a most highly developed uniform mass.

A further object is to provide a mixer which may be readily tilted and maintained in tilted position to facilitate removal of the mixed mass.

A further object is to provide means for covering the top of the mixing receptacle during the mixing operation and so arranged that the receptacle will be automatically uncovered when tilted.

A further object is to provide means for maintaining the mass within the mixer at a predetermined temperature.

The invention will be hereinafter fully set forth and particularly pointed out in the claims.

In the accompanying drawings:—Figure 1 is a front view illustrating my improved mixer. Fig. 2 is a longitudinal sectional view thereof. Fig. 3 is a transverse sectional view on the line 3,—3, Fig. 1. Figs. 4 and 5 are side views of the beater, taken at right angles to each other. Fig. 6 is a detail of the clutch operating mechanism.

Referring to the drawings, 10 designates a casing or receptacle constructed to receive the ingredients to be mixed, and 11, 11' are shafts extending through the ends thereof and rotatably mounted in suitable bearings 13. Keyed or otherwise secured to the respective shafts 11, 11', are spiders 14, 14', the arms of said spiders being staggered.

The ends of alternate arms of the spider 14 are connected by beater rods 15 with the corresponding ends of contiguous arms of the spider 14'. The remaining arms of said spiders are connected by beater bars 16, the contiguous ends of alternate beater bars 16 being located nearer the axis of the beater than the corresponding ends of the remaining beater bars. The effect of this arrangement of beater rods and beater bars is somewhat peculiar, and will be more readily understood from Figs. 4 and 5. From these figures it will be observed that in some positions of the beater in side view, the bars 16 and rods 15 apparently cross each other, and when viewed at right angles a wide space 17 appears between said bars and rods.

The shafts 11, 11', spiders 14, 14', and the beater rods 15 and beater bars 16 comprise a unitary structure which may be rotated in any suitable manner. In the drawings I have illustrated for this purpose, a motor 20 of any suitable or preferred type connected by a sprocket chain with a drive shaft 21 supported by standards 22. Said shaft is provided with pinions 23 which mesh with gears 24 keyed or otherwise secured to the shafts 11, 11'.

The receptacle 10 may be tilted in any suitable manner. In the drawings, however, I have illustrated a counter shaft 25 provided with worm sections 26 which mesh with worm pinions 27 secured to screw shafts 28 extending beneath the receptacle and mounted to rotate in suitable bearings 29. Working on the threaded portion of each shaft 28 is a traveler 30 which is pivotally connected to one end of a link 31, the other end of said link being pivotally connected to a suitable lug 32 secured to the casing or receptacle 10. The counter or work shaft 25 is rotated by means of a sprocket 33 driven by a chain 34 meshing with a sprocket wheel 35 on shaft 21. Said sprocket wheel 35 is connected with a clutch 36 in operative relation with shaft 21. When the gear 35 is clutched to shaft 21, the worm shaft 25 will be rotated in a forward direction, thereby effecting rotation of the screw shafts 28. As the latter shafts rotate the travelers 30 move along the same, and through the links 31 cause the receptacle 10 to swing on its axis, i. e., the shafts 11, 11'. By reversing the clutch a gear 37 on shaft 21 is rotated, which through intermediate pinions 38 and 39 reverses the rotation of work shaft 25, thereby returning the parts to normal position. The clutch lever may be automatically shifted by cams 10ᵃ and 10ᵇ on the receptacle 10.

In order to protect the ingredients within the receptacle 10 during the mixing operation I provide a cover 40 which is rigidly supported in a stationary position in any suitable manner. In the drawings, I have illustrated a protecting casing 41 extending around the various gears and other moving parts outside of the receptacle, and to the casings are secured arms 42 which support the top or cover 40. The rear edge of said cover is provided with a flanged beam 43 which forms an abutment for a beam 44 secured to the upper rear edge of the receptacle 10, said beams coöperating to arrest the rearward movement of the receptacle when the latter is being restored to its upright position after tilting. By this arrangement when the receptacle 10 is tilted, it moves from beneath the cover 40, thereby exposing the contents of the receptacle, and after the latter has been emptied and refilled, it is covered merely by returning it to its upright position.

If desired, I may provide for the heating or cooling of the mass in the receptacle 10 during the mixing operation. This I prefer to do by surrounding the receptacle 10 with a spaced wall 45 covered with insulating material, and placing a coil of pipe 46 within the chamber thus provided. Heating or cooling media, as may be desired, may be caused to circulate through said coil, and a corresponding regulation of temperature thereby maintained. It will be noted that the coil does not contact with either the receptacle or the wall 45. By this arrangement I am enabled to bring out a uniform condition of any temperature in the chamber provided between the shell of the receptacle 10 and the wall 45 and at the same time I do not place any pressure directly on the outer or inner shell and accordingly require no stay-bolting or ribs in this chamber to strengthen it against pressure, as no pressure that may exist in the coil will have any tendency to cause pressure, either in the way of expansion or contraction of the shell of the receptacle or the wall 45.

From the foregoing it will be observed that I have produced a simple and efficient mixer capable of general use.

The particular form of agitator herein described has been found of particular value in mixing dough. For instance, practice has demonstrated that a dough agitated thereby for a given length of time, say anywhere from five to fifteen minutes, is developed to such an extent that considerable time is saved in the fermentation. That is to say the dough is livened up, being filled with little pores, like a sponge, giving the yeast something to work upon immediately for the reason that these pores become inflated with carbonic acid gas which is brought about by the chemical action, and the starch and sugar properties of the flour when so thoroughly incorporated with the liquids, become practically one thing, which is the gum or glutinous mass. And the dough thus treated, instead of becoming short or of a rotten nature, becomes a mass of clear gummy nature, of elastic consistency with the pores uniformly distributed through the entire mass. The temperature of the entire mass is of a uniform degree owing to its rapid and uniform spinning and stretching and continual changing of positions. The beater rods and beater bars are so arranged that the mass is passed back and forth longitudinally of the mixing receptacle and periodically dropped through the space 17, whereby the foregoing results are accomplished.

Having thus explained the nature of my invention and described an operative manner of constructing and using the same, although without attempting to set forth all of the forms in which it may be made or all of the forms of its use, what I claim is:—

1. An improvement in mixers comprising a beater provided with oppositely disposed end members or spiders, beater rods connecting the outer ends of alternate arms of one spider to the outer ends of contiguous arms of the other spider, the remaining arms of said spiders being connected by pairs of beater bars, the bars of one pair being secured at one end to one spider nearer the axis of the beater than the points of union of the other ends with the other spider, the bars of the other pair being secured at one end to the last mentioned spider nearer the axis of the beater than the points of union of the other ends with the first spider, whereby a space is formed for the dough to fall through as the beater rotates.

2. An improvement in mixers comprising a beater provided with oppositely disposed spiders having relatively staggered radial arms, beater rods connecting the ends of alternating arms of one spider to the ends of contiguous arms of the other spider, the bars of one pair being secured at one end to one spider nearer the axis of the beater than the points of union of the other ends with the other spider, the bars of the other pair being secured at one end to the last mentioned spider nearer the axis of the beater than the points of union of the other ends with the first spider, whereby a space is formed for the dough to fall through as the beater rotates.

3. An improvement in mixers comprising a pivotally mounted receptacle, an agitator rotatably mounted therein, means for tilting said receptacle, and a stationary cover supported above said receptacle when in upright position and provided at its rear edge with a beam having a depending abutment, and a bar secured to the upper rear edge of said receptacle and coöperating with the abutment beam to limit pivotal movement of said receptacle in one direction.

4. An improvement in mixers comprising a pivotally mounted receptacle, an agitator rotatably mounted therein, a worm shaft mounted adjacent said receptacle, a screw shaft having its ends mounted in stationary bearings and provided with a worm gear meshing with said worm shaft, a nut movable on and operated by said screw shaft for tilting said receptatcle, and means for connecting said nut and receptacle, whereby movement of the nut effects corresponding movement of the receptacle.

5. An improvement in mixers comprising a pivotally mounted receptacle, an agitator rotatably mounted therein, a screw shaft extending beneath said receptacle, stationary bearings for the ends of said screw shaft, a nut working on said screw shaft, a link pivotally connected at one end to said nut and at the other end to said receptacle, means for rotating said shaft in either direction, and a clutch for controlling the direction of rotation.

6. An improvement in mixers comprising a pivotally mounted receptacle, an agitator rotatably mounted therein, a screw shaft extending beneath said receptacle, stationary bearings for the ends of said screw shaft, a nut working on said screw shaft, a link pivotally connected at one end to said nut and at the other end to said receptacle, means for rotating said shaft in either direction, a clutch for controlling the direction of rotation, and cam members carried by said receptacle for automatically shifting said clutch.

In testimony whereof I have hereunto set my hand in presence of two subscribing witnesses.

ROBERT M. TEMPLE.

Witnesses:
  FRANCES M. STEWART,
  ARNOLD KATZ.